(12) United States Patent
Fukuike et al.

(10) Patent No.: US 8,703,857 B2
(45) Date of Patent: Apr. 22, 2014

(54) TOP COAT PAINT, CORROSION RESISTANT SURFACE-TREATED CHAIN AND CORROSION RESISTANT SURFACE-TREATED SPROCKET

(75) Inventors: Yuji Fukuike, Osaka (JP); Tomohide Takada, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 246 days.

(21) Appl. No.: 13/146,851

(22) PCT Filed: Dec. 29, 2009

(86) PCT No.: PCT/JP2009/007366
§ 371 (c)(1),
(2), (4) Date: Jul. 28, 2011

(87) PCT Pub. No.: WO2010/086953
PCT Pub. Date: Aug. 5, 2010

(65) Prior Publication Data
US 2011/0281992 A1 Nov. 17, 2011

(30) Foreign Application Priority Data
Jan. 30, 2009 (JP) ................. 2009-020603

(51) Int. Cl.
| C08K 3/08 | (2006.01) |
| C08K 3/34 | (2006.01) |
| C08F 120/18 | (2006.01) |
| B32B 9/00 | (2006.01) |
| B32B 3/12 | (2006.01) |
| G11B 5/706 | (2006.01) |

(52) U.S. Cl.
USPC ........... 524/440; 524/442; 524/449; 524/443; 526/329.7; 428/41.5; 428/844.8; 428/160

(58) Field of Classification Search
USPC ................. 524/400, 442, 449, 443; 474/152; 59/84; 428/41.5, 844.8, 160; 526/329.7
See application file for complete search history.

(56) References Cited

U.S. PATENT DOCUMENTS

2003/0204018 A1 10/2003 Granel et al.
2012/0052294 A1 3/2012 Poulet et al.

FOREIGN PATENT DOCUMENTS

| EP | 0 810 297 A1 | 12/1997 |
| EP | 810297 A1 * | 12/1997 |
| JP | H06-146005 A | 5/1994 |
| JP | H09-12864 | 1/1997 |
| JP | 9-317832 A | 12/1997 |
| JP | 09317832 A * | 12/1997 |
| JP | H10-338579 A | 12/1998 |
| JP | 3122037 B2 | 1/2001 |
| JP | 2001-179171 A | 7/2001 |
| JP | 2004-68031 A | 3/2004 |

(Continued)

Primary Examiner — Michael Bernshteyn
(74) Attorney, Agent, or Firm — Muncy, Geissler, Olds & Lowe, P.C.

(57) ABSTRACT

The roller chain comprises inner link plates, a bush, outer link plates, a connecting pin, and a roller. Each of the chain components has a zinc-iron alloy ground film formed on an iron-based base material by impact zinc plating and a first coating film formed by using a water-based rust preventive paint including zinc, nitrate, and an organic compound having a mercapto group other than a mercapto group-containing silane coupling agent. Then a second coating film is formed on the first coating film by using the top coat paint comprising a pigment, sodium silicate, and an acrylic emulsion or a polyurethane water-based composition.

22 Claims, 4 Drawing Sheets

(56) References Cited

FOREIGN PATENT DOCUMENTS

| | | | |
|---|---|---|---|
| JP | 2004068031 A * | 3/2004 | |
| JP | 2008-143945 A | 6/2008 | |
| JP | 2008-143946 A | 6/2008 | |
| JP | 2008-144059 A | 6/2008 | |
| JP | 2008-144077 A | 6/2008 | |
| JP | 2008-144111 A | 6/2008 | |
| JP | 2008-150537 A | 7/2008 | |
| JP | 2008-175241 A | 7/2008 | |
| JP | 2009-079075 A | 4/2009 | |
| TW | 200303337 A | 9/2003 | |
| TW | 200517459 A | 6/2005 | |
| WO | WO 2008/029833 A1 | 3/2008 | |
| WO | WO 2009/066872 A1 | 5/2009 | |

\* cited by examiner

F I G. 3
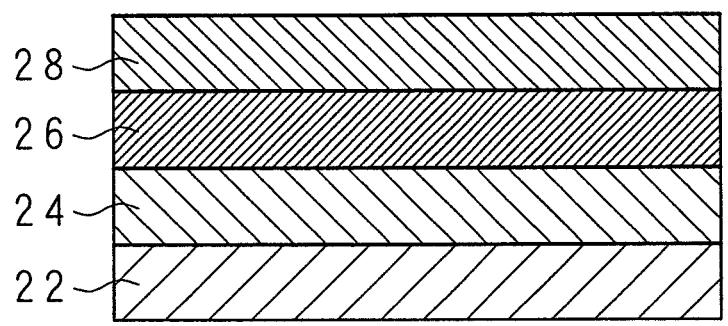

TOP COAT PAINT, CORROSION RESISTANT SURFACE-TREATED CHAIN AND CORROSION RESISTANT SURFACE-TREATED SPROCKET

This application is the national phase under 35 U.S.C. §371 of PCT International Application No. PCT/JP2009/007366 which has an International filing date of Dec. 29, 2009 and designated the United States of America.

BACKGROUND

1. Technical Field

The present invention relates to a top coat paint exhibiting good rust resistance and good adhesion when formed into a coating film, a corrosion resistant surface-treated chain such as a bushed chain or a roller chain and a corrosion resistant surface-treated sprocket, for use in a corrosive atmosphere of brine, an acid, an alkali or the like on which a coating film is formed by using the top coat paint.

2. Description of Related Art

In order to prevent corrosion of a machinery such as a chain used in a corrosive atmosphere of brine, an acid, an alkali or the like, the surface of an iron base material of each component of the chain or the like was conventionally covered with a metal baser than iron such as zinc or covered with a metal nobler than iron such as nickel. Examples of the former zinc plating are electrogalvanizing and particle impact zinc plating, and examples of the latter nickel plating are nickel electroplating and electroless nickel plating.

Furthermore, a sacrificial corrosion preventive function of zinc and aluminum (a function to suppress corrosion of iron attained because such a metal has higher ionization tendency than iron and hence is eluted prior to iron) was utilized for forming a coating film on the surface of an iron base material of each component of the chain or the like by using a water-based rust preventive paint including zinc and aluminum as a metal pigment.

Japanese Patent No. 3122037 discloses an invention of an anticorrosive chain component in which a zinc film is formed on an iron base in a non-hydrogen atmosphere and a water-based rust preventive paint including an aluminum powder and a silicone resin is baking-finished so as to form a white rust inhibiting baked coating film.

SUMMARY

In the case where a coating film is formed on the surface of each component of the chain by using the aforementioned water-based rust preventive paint, however, the coating film is easily powdered in fabricating the chain by assembling the component or in rubbing the chain in use, which causes problems that the workability is degraded because hands are stained, that the appearance quality of the chain is degraded and that the performance is lowered because the coating film is partly thinned.

The present invention was devised in consideration of these circumstances, and an object of the invention is providing a top coat paint exhibiting good rust resistance and good adhesion onto a coated object, and a corrosion resistant surface-treated chain and a corrosion resistant surface-treated sprocket having a coating film formed thereon by using the top coat paint, having powdering of the coating film suppressed and exhibiting good corrosion resistance.

The present inventors have found, through earnest study and examination, that peeling of a coating film may be suppressed while attaining good corrosion resistance by overpainting, with a top coat paint including sodium silicate and an acrylic emulsion or a polyurethane water-based composition, a coating film formed on a surface of a coated object by using a water-based rust preventive paint including zinc, resulting in completing the present invention.

Specifically, according to the first invention, the top coat paint, which includes a pigment and is used for overpainting a coating film formed by using a water-based rust preventive paint including zinc, includes: sodium silicate; and an acrylic emulsion or a polyurethane water-based composition.

At this point, the acrylic emulsion is a substance obtained by emulsion polymerizing a monomer including an acrylic acid-based monomer as a principal component by using an emulsifier in an aqueous system.

Also, the polyurethane water-based composition is a composition obtained by using a urethane prepolymer compound obtained through a reaction between a compound having an isocyanate group and a compound having an active hydrogen group, so as to be dispersed in water (obtained as a urethane emulsion) or dissolved in water. The active hydrogen group is a functional group including hydrogen to be reacted with an isocyanate group, and examples of the active hydrogen group are a hydroxyl group, a primary or secondary amino group and a thiol group.

In this invention, a coating film to be formed has good rust resistance and has good adhesion also because the top coat paint is easily permeated into the coating film formed by using the water-based rust preventive paint.

According to the second invention, the acrylic emulsion is obtained by emulsion polymerizing a polymerizable monomer including a monomer having an alkoxysilyl group and having an ethylene double bond, and a mass ratio between an active ingredient of the sodium silicate and an active ingredient of the acrylic emulsion is in a range from 0.1 to 17 in the top coat paint of the first invention.

In this invention, the rust resistance and the adhesion of the coating film are further improved.

According to the third invention, the polyurethane water-based composition is obtained by mixing a polyurethane resin having at least one silanol group in a molecule and strong basic tertiary amine, and a mass ratio between an active ingredient of the sodium silicate and an active ingredient of the polyurethane water-based composition is in a range from 0.1 to 17 in the top coat paint of the first invention.

In this invention, the rust resistance and the adhesion of the coating film are further improved.

According to the fourth invention, the pigment is a mica powder pigment or a titanated mica pigment, and a mass ratio between the pigment and a total mass of the pigment, an active ingredient of the sodium silicate and an active ingredient of the acrylic emulsion or the polyurethane water-based composition is in a range from 0.08 to 0.5 in the top coat paint of any of the first through third inventions.

In this invention, the coating film has well-balanced rust resistance and adhesion.

According to the fifth invention, the top coat paint of the fourth invention further includes stainless steel flakes.

In this invention, the coating film is provided with good luster.

According to the sixth invention, the corrosion resistant surface-treated chain made of an iron-based material, includes: a pair of outer link plates and a pair of inner link plates which are alternately connected to each other; and a first coating film formed on a surface of the iron-based material by using a water-based rust preventive paint including zinc, wherein the chain comprises a second coating film formed on the first coating film by using the top coat paint of any of the first through fifth inventions.

At this point, the iron-based material means iron or an iron alloy including iron as a principal component, and an example of the iron alloy is an alloy including, together with iron, carbon, silicon, magnesium, cerium, nickel, chromium, molybdenum, copper or the like. Specific examples of the iron alloy are steel and cast iron.

In this invention, since the iron-based base material is covered with the first coating film formed by using the water-based rust preventive paint including zinc, zinc having higher ionization tendency than iron is eluted prior so as to suppress generation of red rust, and hence, the chain has high durability.

Furthermore, since the second coating film is formed by using the top coat paint of the present invention, the adhesion of the coating film is good, and powdering of the coating film caused in assembling chain components and in use of the chain is suppressed. Accordingly, the workability and the appearance quality are good, and the thickness of the coating film is uniformly retained, so as to keep good corrosion resistance.

According to the seventh invention, the corrosion resistant surface-treated chain of the sixth invention further includes a zinc-iron alloy ground film formed between the surface and the first coating film by impact zinc plating.

At this point, the impact zinc plating means plating for forming a film structure by laminating a blast material made of a zinc-iron alloy which is blasted to the iron base material surface.

In this invention, since the iron-based base material included in a chain component is covered by the impact zinc plating, the generation of red rust is suppressed by the sacrificial corrosion preventive function of zinc included in the zinc-iron alloy ground film and the first coating film, and in addition, since the coating film has good adhesion, the chain attains higher durability.

According to the eighth invention, the water-based rust preventive paint includes zinc, nitrate and an organic compound having a mercapto group other than a mercapto group-containing silane coupling agent in the corrosion resistant surface-treated chain of the sixth or seventh invention.

In this invention, the first coating film is formed by using the water-based rust preventive paint in which the zinc is covered with the organic compound and a reaction between the zinc and water is sufficiently suppressed so as to attain good storage stability, and therefore, the sacrificial corrosion preventive function is more effectively exhibited by the zinc included in the first coating film in a sufficiently large quantity.

According to the ninth invention, the corrosion resistant surface-treated sprocket, which is made of an iron-based material and comprises teeth to be engaged with a chain on an outer circumference thereof, wherein the sprocket comprises:
 a first coating film formed on a surface of iron-based material by using a water-based rust preventive paint including zinc; and a second coating film formed on the first coating film by using the top coat paint of any of the first through fifth inventions.

In this invention, an iron-based base material is covered with the first coating film formed by using the water-based rust preventive paint including zinc, and hence, zinc having higher ionization tendency than iron is eluted prior so as to suppress generation of red rust, and hence, the sprocket exhibits high durability.

Furthermore, since the second coating film is formed by using the top coat paint of the present invention, the coating film has good adhesion, and powdering of the coating film caused in fabrication of the sprocket or in use thereof is suppressed. Accordingly, the workability and the appearance quality are improved, and the thickness of the coating film is retained uniformly, so as to retain good corrosion resistance.

According to the tenth invention, the corrosion resistance surface-treated sprocket of the ninth invention further includes a zinc-iron alloy ground film formed between the surface and the first coating film by impact zinc plating.

In this invention, since the iron-based base material is covered by the impact zinc plating, the generation of red rust is suppressed due to the sacrificial corrosion preventive function of zinc included in the zinc-iron alloy ground film and the first coating film, and in addition, since the coating film has good adhesion, the sprocket exhibits higher durability.

According to the eleventh invention, the water-based rust preventive paint includes zinc, nitrate and an organic compound having a mercapto group other than a mercapto group-containing silane coupling agent in the corrosion resistance surface-treated sprocket of the ninth or tenth invention.

In this invention, the first coating film is formed by using the water-based rust preventive paint in which the zinc is covered with the organic compound and a reaction between the zinc and water is sufficiently suppressed so as to attain good storage stability, and therefore, the sacrificial corrosion preventive function is more effectively exhibited by the zinc included in the first coating film in a sufficiently large quantity.

Since the top coat paint according to the present invention includes sodium silicate and an acrylic emulsion or a polyurethane water-based composition, it has good rust resistance and has good adhesion to a coated object or a coating film including zinc and formed on a surface of the coated object.

Accordingly, in assembling components of a machinery on which a coating film is formed by using the top coat paint, or in using the assembled machinery, powdering of the coating film is suppressed, and hence, the workability and the appearance quality of the machinery are improved, and the thickness of the coating film is retained uniformly so as to retain corrosion resistance of the machinery.

In the corrosion resistant surface-treated chain and the corrosion resistant surface-treated sprocket of the present invention, the second coating film is formed by using the top coat paint of the present invention on the first coating film formed by using the water-based rust preventive paint including zinc, and therefore, the generation of red rust may be well suppressed by the first coating film and the second coating film, and in addition, since powdering of the coating film is suppressed in fabrication or in use, the workability and the appearance quality are improved, and the thickness of the coating film is retained uniformly so as to retain good corrosion resistance. Accordingly, the chain and the sprocket have high durability.

The above and further objects and features will more fully be apparent from the following detailed description with accompanying drawings.

BRIEF DESCRIPTION OF THE SEVERAL VIEWS OF THE DRAWINGS

FIG. 3 is an enlarged cross-sectional view of a part A of FIG. 1.

DETAILED DESCRIPTION (1) Top Coat Paint

Figure 1:
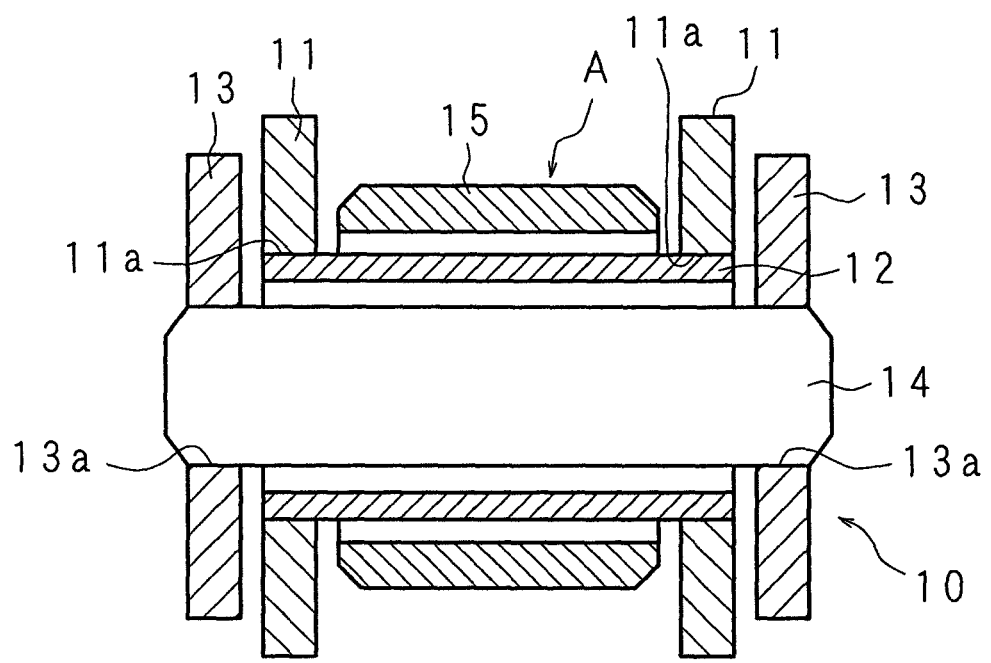
FIG. 1 is a partial cross-sectional view of a roller chain described as an example of a corrosion resistant surface-treated chain coated with a top coat paint of the present invention.

The top coat paint according to the present invention is a coating used for overpainting a coating film formed by using a water-based rust preventive paint including zinc, and includes a pigment, sodium silicate, and an acrylic emulsion or a polyurethane water-based composition.

As described above, the acrylic emulsion is a substance obtained by emulsion polymerizing a monomer including an acrylic acid-based monomer as a principal component by using an emulsifier in an aqueous system. The monomer may be any compound that may make a contribution to improvement of the corrosion resistance, the adhesion and the like of a coating film obtained by using the top coat paint of this invention by forming a crosslinked structure inside a polymer or between polymers of the emulsion. The acrylic emulsion may include an inorganic polymer.

A specific example of the acrylic emulsion is a substance obtained by emulsion polymerizing a polymerizable monomer including a monomer having an alkoxysilyl group and having an ethylene double bond.

An example of the polyurethane water-based composition is a substance including a polyurethane resin having at least one silanol group in a molecule and strong basic tertiary amine. The strong basic tertiary amine functions as a curing catalyst. Examples of the strong basic tertiary amine are 1,8-diazabicyclo[5.4.0]undecene-7 and 1,8-diazabicyclo[3.4.0]nonene-5.

The polymer of the acrylic emulsion may be any of a homopolymer of a monomer having an alkoxysilyl group and having an ethylene double bond and a copolymer of the monomer and another monomer having an ethylene double bond. Examples of the monomer having an alkoxysilyl group and having an ethylene double bond are γ-methacryloxypropyltrimethoxysilane, γ-methacryloxypropylmethyldimethoxysilane and vinyltriisopropoxysilane. Examples of another monomer having an ethylene double bond are butyl methacrylate, 2-ethylhexyl acrylate, cyclohexyl methacrylate, methyl methacrylate, butyl acrylate, ethyl acrylate, methyl acrylate, acrylic acid and methacrylic acid. As the emulsifier, any of known surface active agents may be used.

For obtaining the polyurethane water-based composition, a compound having at least two active hydrogen groups per molecule, a compound having at least two isocyanate groups per molecule and a compound having a hydrophilic group in a molecule and having at least one active hydrogen group are first reacted with one another to give a polyurethane prepolymer. Next, the hydrophilic group of the polyurethane prepolymer is neutralized by a counteragent, strong basic tertiary amine is added to the resultant, and the polyurethane polymer to which the counteragent and the strong basic tertiary amine have been added is dispersed in or dissolved in water in which a compound having, in one molecule, at least one active hydrogen group reactive with an isocyanate group and a hydrolytic silicon group and another chain extender are dissolved, resulting in obtaining the polyurethane water-based composition.

The top coat paint of the present invention includes sodium silicate in addition to the acrylic emulsion or the polyurethane water-based composition, and therefore, it has good adhesion and is further improved in the rust resistance.

When the acrylic emulsion is used, a mass ratio between an active ingredient of the sodium silicate and an active ingredient of the acrylic emulsion is preferably in a range from 0.1 to 17. When the mass ratio is 0.1 or more and 17 or less, a coating film formed from the top coat paint exhibits good rust resistance and adhesion. From the viewpoint of further improving the adhesion, the mass ratio is more preferably in a range from 0.1 to 4.2, from the viewpoint of further improving the adhesion, the mass ratio is further more preferably in a range from 0.1 to 1.4, and from the viewpoint of further improving the rust resistance, the mass ratio is particularly preferably in a range from 0.2 to 1.4.

When the polyurethane water-based composition is used, a mass ratio between the active ingredient of the sodium silicate and an active ingredient of the polyurethane water-based composition is preferably in a range from 0.1 to 17. When the mass ratio is 0.1 or more and 17 or less, a coating film formed from the top coat paint exhibits good rust resistance and adhesion. From the viewpoint of further improving the rust resistance, the mass ratio is more preferably in a range from 0.5 to 17, from the viewpoint of further improving the rust resistance, the mass ratio is further more preferably in a range from 0.6 to 17, from the viewpoint of further improving the adhesion, the mass ratio is particularly preferably in a range from 0.6 to 5.2, and from the viewpoint of further improving the adhesion, the mass ratio is the most preferably in a range from 0.6 to 2.4.

As the pigment, a mica powder pigment including a mica powder or a titanated mica pigment including titanated mica is preferably used. In the titanated mica, a surface of a flaky mica powder is covered with titanium dioxide, so as to exhibit pearly luster due to a thin film interference effect, and the titanated mica pigment is a kind of pearl pigment. One of these pigments may be singly used or a mixture of them may be used.

In the case where the mica powder pigment or the titanated mica pigment is used as the pigment, a mass ratio between the pigment and a total mass of the pigment, the active ingredient of the sodium silicate and the active ingredient of the acrylic emulsion or the polyurethane water-based composition is preferably in a range from 0.08 to 0.5.

When the top coat paint has such a mass ratio, the rust resistance and the adhesion of the coating film are well balanced. In the case where the mass ratio exceeds 0.5, it is confirmed that the adhesion is degraded, through an adhesion evaluation test described later. Furthermore, in the case where the acrylic emulsion is used, the mass ratio is more preferably in a range from 0.08 to 0.4.

The top coat paint of the present invention may include a second pigment of stainless steel flakes or the like for providing luster.

The top coat paint is obtained by mixing and stirring the aforementioned respective components by a normal fabrication method. In the fabrication, water, a water-soluble solvent such as an alcohol-based solvent, a glycol ether-based solvent or a glycol-based solvent, and an additive for a coating such as a surface active agent, a dispersing agent or an antifoaming agent may be mixed. A general additive for a coating, such as a polycarboxylic acid-based dispersing agent, a nonionic or anionic surface active agent, a urethane-based thickening agent or a silicone-based or acrylic-based antifoaming agent, may be mixed, and a leveling agent may be further mixed.

(2) Corrosion Resistant Surface-Treated Chain

The corrosion resistant surface-treated chain of this invention is made of an iron-based material, and may be either a bushed chain including a pair of inner link plates disposed to be spaced from each other, a bush press-fit in bush press fitting holes of the inner link plates, a pair of outer link plates disposed outside the inner link plates for connecting front and back inner link plates and a connecting pin freely fit on the inner circumferential face of the bush to be press-fit in pin press fitting holes of the outer link plates, or a roller chain further including a roller freely fit on the outer circumferential faces of the connecting pin and the bush.

Examples of specific use applications of the corrosion resistant surface-treated chain of the invention are carrying conveyor chains such as a conveyor chain for use in a driving mechanism for a food carrying tray conveyor used in a high humidity environment and in a state periodically cleaned, conveyor chains for use in a driving mechanism for a roller conveyor and a driving mechanism for a brush and a blower, disposed in a car wash and splashed with water and a detergent, a suspended chain of a stacker crane for use in mushroom cultivation used in a high temperature and high humidity environment, a conveyor chain for use in a driving mechanism for a roller conveyor for carrying and cleaning bottle cases splashed with a cleaning fluid, a conveyor chain run in water for raking sludge settled in the water, and a conveyor chain for use in a driving mechanism for an open-air conveyor installed in the vicinity of the seashore to be exposed to the sea breezes, and a transmission chain for transmitting power used in an engine or the like.

The specific shape of the inner link plates and the outer link plates used in the corrosion resistant surface-treated chain of the invention may be any of an oval shape and a gourd shape.

The corrosion resistant surface-treated chain of the invention has, on the surface of an iron-based base material of each of the aforementioned components, the first coating film formed by using the water-based rust preventive paint. The iron-based base material may have been subjected to a surface treatment. As the surface treatment, it is possible to employ shot blasting in which shots (small steel balls) are blasted with high-pressure air against the surface to be hit for finishing. On the surface, a ground film is preferably formed by zinc plating, and a zinc-iron alloy ground film is more preferably formed by impact zinc plating.

The water-based rust preventive paint preferably includes zinc, nitrate and an organic compound having a mercapto group other than a mercapto group-containing silane coupling agent. The zinc, the nitrate and the organic compound together produce a water-based rust preventive pigment. Although the water-based rust preventive paint may include a base metal other than zinc, it is preferred not to include aluminum as a pigment from the viewpoint of degradation in storage stability.

The content of the zinc in the water-based rust preventive paint is preferably in a range from 5 mass % to 90 mass %. When the content is in a range from 5 mass % to 90 mass %, the sacrificial corrosion preventive function of the zinc is well exhibited.

The form and the like of the zinc are not particularly specified and the zinc may be in the form of a sphere, a flake, a rod or the like. Particularly, when the zinc in the form of a flake is used for the coating, a covering effect for a coated object is high and excellent corrosion prevention is exhibited. The zinc in the form of a flake is obtained by an expanding treatment with a ball mill, an attritor or the like, and preferably has an average aspect ratio (an average major axis/an average thickness) of 10 or more.

The thus obtained flake-shaped zinc powder is kneaded with the organic compound having a mercapto group other than a mercapto group-containing silane coupling agent, the nitrate is further added thereto and the resultant is kneaded, resulting in obtaining a water-based rust preventive pigment in which the zinc is covered with the organic compound. The pigment may be in the form of a powder or a slurry.

The nitrate may be added together with the organic compound in the expanding treatment or added in kneading the zinc powder and the organic compound as described above.

In the aforementioned expanding treatment, the organic compound may be used as a grinding assistant so as to directly cover the metal surface, or a general grinding assistant of a saturated fatty acid such as stearic acid, an unsaturated fatty acid such as oleic acid, hydrofluorate or the like may be used together.

Furthermore, in the expanding treatment and the kneading treatment, a surface active agent and any of the aforementioned grinding assistants may be added as a dispersion assistant.

The kneading treatment may be performed in the presence of an organic solvent, and particularly when a water-soluble solvent is used, a slurry resulting from the treatment may be preferably directly added as a water-based rust preventive pigment to the water-based rust preventive paint.

Examples of the water-soluble solvent are a glycol-based solvent such as propylene glycol or ethylene glycol, an alcohol-based solvent such as ethanol or isopropanol and a glycol ether-based solvent such as dipropylene glycol monomethyl ether.

Examples of the organic compound having a mercapto group are 3-mercaptopropionic acid, ethylhexyl mercaptopropionate, methoxybutyl mercaptopropionate, tridecyl mercaptopropionate, pentaerythritol tetrakispropionate, 4-mercaptophenol, thioglycolic acid, monoethanol amine thioglycolate, ethylhexyl thioglycolate, methyl thioglycolate and ethyl thioglycolate. One of these organic compounds may be singly used or two or more of them may be used together.

The content of the organic compound in the zinc powder is preferably 1 through 13 parts by mass, more preferably 3 through 13 parts by mass, further more preferably 3 through 10 parts by mass and particularly preferably 5 through 8 parts by mass per 100 parts by mass of the zinc powder. When the content is smaller than 1 part by mass, the content is not sufficient for treating the surface of the zinc powder and the stability (storage stability) attained in water is insufficient, and when the content exceeds 13 parts by mass, the content of the organic compound is so large that improvement in the stability in water may not be expected.

Examples of the nitrate included in the water-based rust preventive pigment are potassium nitrate, calcium nitrate, magnesium nitrate, nickel nitrate and cobalt nitrate. Particularly, magnesium nitrate or nickel nitrate is preferably used. One of these nitrates may be singly used or two or more of them may be used together.

The content of the nitrate is preferably 0.1 through 10 parts by mass, more preferably 3 through 9 parts by mass and further more preferably 3 through 7 parts by mass per 100 parts by mass of the zinc powder. When the content is smaller than 0.1 part by mass, the content is not sufficient for improving the efficiency in covering the surface of the zinc powder with the organic compound and the stability in water of the water-based rust preventive pigment is insufficient, and when the content exceeds 10 parts by mass, the improvement in the stability in water may not be expected.

The water-based rust preventive pigment preferably includes a magnesium compound and further preferably includes it as the magnesium nitrate.

A mass ratio of magnesium to zinc included in the water-based rust preventive pigment is preferably 0.05 mass % through 10 mass %, more preferably 0.2 mass % through 2.0 mass %, and further more preferably 0.4 mass % through 1.0 mass %. In the case where the ratio is 0.05 mass % through 10 mass %, when the water-based rust preventive pigment is used for producing the water-based rust preventive paint and the resultant water-based rust preventive paint is applied to a chain component, the magnesium is eluted prior to the zinc, and therefore, the quantity of eluted zinc may be suppressed so as to retain the corrosion resistance over a long period of time.

In producing the water-based rust preventive pigment, the respective components may be individually added, a part or the whole of the components may be precedently mixed to be added, or the components may be mixed with water and any of the aforementioned solvents to be added in the form of a slurry.

The water-based rust preventive paint is obtained by mixing and stirring the respective components by a normal fabrication method. In the fabrication, water, a water-soluble solvent such as an alcohol-based solvent, a glycol ether-based solvent or a glycol-based solvent, and an additive for a coating such as a surface active agent, a surface adjuster, a dispersing agent, a dispersion assistant or an antifoaming agent may be mixed. A general additive for a coating, such as a polycarboxylic acid-based dispersing agent, a nonionic or anionic surface active agent, a urethane-based thickening agent or a silicone-based or acrylic-based antifoaming agent, may be mixed, and a leveling agent may be further mixed.

In the corrosion resistance surface-treated chain of the present invention, the second coating film is formed on the first coating film by using the aforementioned top coat paint of the invention.

After the water-based rust preventive paint and the top coat paint of the invention are applied on the surfaces of the components of the corrosion resistant surface-treated chain by, for example, a dip spin method or the like, they are dried through baking, so as to form the first coating film and the second coating film. Since the water-based rust preventive paint and the top coat paint have the aforementioned compositions, they may be dried through the baking at a temperature of 180° C. or less.

Accordingly, the hardness of the chain components is not spoiled, and degradation in the strength and the life of the chain is suppressed.

FIG. 1 is a partial cross-sectional view of a roller chain 10 described as an example of the corrosion resistant surface-treated chain on which the top coat paint of the invention is applied.

The roller chain 10 includes, as illustrated in FIG. 1, a pair of inner link plates 11 disposed to be spaced from each other, a bush 12 press-fit in bush press fitting holes 11a of the inner link plates 11, a pair of outer link plates 13 disposed outside the inner link plates 11 and connected to front and back inner link plates 11, a connecting pin 14 freely fit on the inner circumference of the bush 12 and press-fit in pin press fitting holes 13a of the outer link plates 13, and a roller 15 freely fit on the outer circumference of the bush 12.

(3) Corrosion Resistant Surface-Treated Sprocket

The corrosion resistant surface-treated sprocket of the present invention is made of an iron-based material and has teeth to be engaged with a chain on its outer circumference. The sprocket may be formed by fabricating a plurality of components or may be integrally formed.

The corrosion resistant surface-treated sprocket of the present invention has a first coating film formed by using the aforementioned water-based rust preventive paint on the surface of at least a side face of an iron-based base material. The iron-based base material may have been subjected to a surface treatment. As the surface treatment, the shot blasting may be performed. A ground film is preferably formed on the surface by the zinc plating and a zinc-iron alloy ground film is more preferably formed by the impact zinc plating.

In the corrosion resistant surface-treated sprocket of the present invention, the second coating film is formed on the first coating film by using the aforementioned top coat paint of the invention.

After the water-based rust preventive paint and the top coat paint of the invention are applied on the surface of the sprocket by, for example, the dip spin method or the like, they are dried through baking, so as to form the first coating film and the second coating film. Since the water-based rust preventive paint and the top coat paint have the aforementioned compositions, they may be dried through the baking at a temperature of 180° C. or less.

Accordingly, the hardness of the sprocket is not spoiled, and degradation in the strength and the life is suppressed.

It is noted that the first coating film and the second coating film may be formed by spraying or painting.

Figure 2:
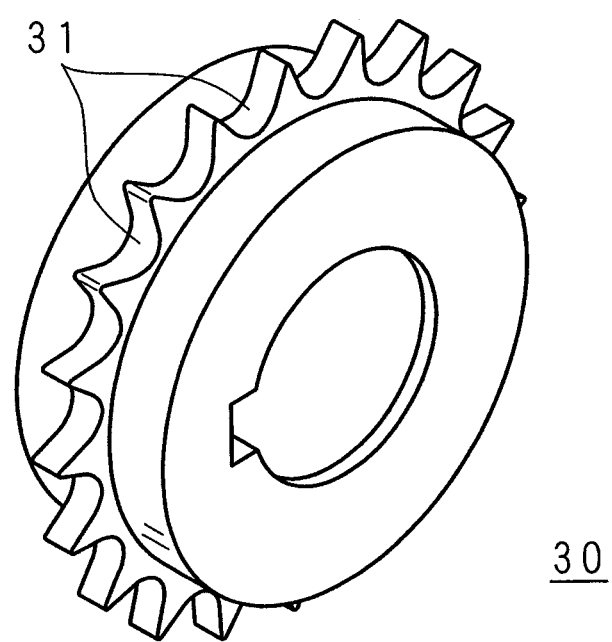
FIG. 2 is a perspective view of a sprocket described as an example of a corrosion resistant surface-treated sprocket having, on an outer circumference thereof, teeth to be engaged with the corrosion resistant surface-treated chain of FIG. 1.

FIG. 2 is a perspective view of a sprocket 30, described as an example of the corrosion resistant surface-treated sprocket of the invention, having teeth to be engaged with the roller chain 10 on the outer circumference.

The sprocket 30 has, in a substantially center portion along the thickness direction, teeth 31 to be engaged with the roller 15 of the roller chain 10.

An example of a layered structure formed on the surface of each of the teeth 31 is a structure in which the zinc-iron alloy ground film formed by the impact zinc plating, the first coating film formed by using the water-based rust preventive paint and the second coating film formed by using the top coat paint of the invention are stacked on the iron-based base material.

EXAMPLES

Now, examples and comparative examples of the invention will be specifically described, and it is noted that the invention is not limited to these examples.

1. Water-Based Rust Preventive Paint

Composition Example 1

In accordance with a composition (in parts by mass) listed in Table 1 below, a flake-shaped zinc powder (with an average major axis of 15 μm and an average thickness of 0.5 μm), a surface active agent, a dispersion assistant and ethylhexyl thioglycolate were mixed and stirred in dipropylene glycol monomethyl ether for 3 hours, magnesium nitrate was further added to the resultant, and the resultant mixture was further stirred so as to give a zinc paste. In the zinc paste, the surface of the zinc powder is covered with the ethylhexyl thioglycolate. The zinc paste was mixed with a dispersing agent, a hydrolysate of 3-aminopropyltriethoxysilane ("KBP90" manufactured by Shin-Etsu Chemical Co., Ltd.), water, a flow improver ("BYK420" manufactured by BYK-Chemie GmbH), an antifoaming agent ("SN defoamer 1070" manufactured by San Nopco Limited) and a surface adjuster, so as to give a water-based rust preventive paint of Composition Example 1. Since the aforementioned "KBP90" is added, effects to stabilize Zn in water and to improve adhesion are attained.

TABLE 1

| Material | (parts by mass) Composition Example 1 |
|---|---|
| Dipropylene glycol monomethyl ether | 15.10 |
| Surface active agent | 0.89 |
| Dispersion assistant | 0.30 |
| Ethylhexyl thioglycolate | 2.48 |
| Zn | 37.76 |
| $Mg(NO_3)_2 \cdot 6H_2O$ | 2.48 |
| Dispersing agent | 9.50 |
| Hydrolysate of 3-aminopropyltriethoxysilane | 1.90 |
| Water | 35.50 |
| Flow improver | 0.70 |
| Antifoaming agent | 0.20 |
| Surface adjuster | 0.20 |
| Total | 107.01 |

2. Top Coat Paint (1)

Example 1

In accordance with a composition listed in Table 2 below, a pearl pigment ("Iriodin 103WNT" manufactured by Merck Ltd. Japan), a second pigment (with an active ingredient (remaining after heating) of 50%), an acrylic emulsion ["Yodozol AX-6" manufactured by Henkel Technologies Japan Ltd., with an active ingredient (remaining after heating) of 42%, hereinafter referred to as "AX-6"], sodium silicate [tetra sodium penta silicate according to the JIS, with an active ingredient (remaining after heating) of 51%], an antifoaming agent ("SN defoamer 5016" manufactured by San Nopco Limited), a surface active agent, a thickening agent ("AW-15F" manufactured by FUJICHEMI HEC Co., Ltd., hydroxyethyl cellulose) and water were mixed and stirred for 1 hour, so as to give a top coat paint (1) of Example 1.

In Table 2 and Table 3 below, "Sodium silicate/acrylic emulsion" corresponds to a mass ratio between the active ingredient of the sodium silicate and the active ingredient of the acrylic emulsion, and "PWC (Pigment Weight Concentration)" corresponds to a mass ratio (expressed by a percentage here) in a formed coating film between (Iriodin 103WNT) and (Iriodin 103WNT+the active ingredient of AX-6+the active ingredient of sodium silicate).

TABLE 2

| | | | | Examples | | | | (parts by mass) |
|---|---|---|---|---|---|---|---|---|
| | | 1 | 2 | 3 | 4 | 5 | 6 | 7 |
| Pearl pigment | | 1 | 3.9 | 7 | 3.9 | 3.9 | 3.9 | 3.9 |
| Second pigment | | 0.4 | 0.4 | 0.4 | 0.4 | 0.4 | 0.4 | 0.4 |
| Acrylic emulsion | | 23 | 23 | 23 | 20 | 15 | 11 | 5 |
| Sodium silicate | | 2.2 | 2.2 | 2.2 | 4.6 | 8.8 | 12 | 17 |
| Antifoaming agent | | 0.05 | 0.05 | 0.05 | 0.05 | 0.05 | 0.05 | 0.05 |
| Surface active agent | | 0.2 | 0.2 | 0.2 | 0.2 | 0.2 | 0.2 | 0.2 |
| Thickening agent | | 0.6 | 0.6 | 0.6 | 0.6 | 0.6 | 0.6 | 0.6 |
| Water | | 72.55 | 69.65 | 66.55 | 70.25 | 71.05 | 71.85 | 72.85 |
| Total | | 100.00 | 100.00 | 100.00 | 100.00 | 100.00 | 100.00 | 100.00 |
| Sodium silicate/ acrylic emulsion | | 0.12 | 0.12 | 0.12 | 0.28 | 0.71 | 1.32 | 4.11 |
| PWC (%) | | 8.5 | 26.6 | 39.4 | 26.6 | 26.6 | 26.6 | 26.6 |
| Time till generation of red rust (h) | Plate (1) | 750 | 800 | 850 | 1000 | 1000 | 1000 | 800 |
| | Plate (2) | 700 | 700 | 800 | 950 | 950 | 950 | 700 |
| | Chain | 750 | 800 | 850 | 1000 | 1000 | 1000 | 800 |
| Evaluation | Corrosion resistance | A1 | A2 | A2 | A3 | A3 | A3 | A2 |
| | Adhesion | A3 | A3 | A3 | A3 | A3 | A3 | A2 |

Examples 2 Through 11

In accordance with compositions listed in Table 2 and Table 3 below, top coat paints (1) of Examples 2 through 11 were obtained in the same manner as in Example 1.

TABLE 3

(parts by mass)

| | | Examples | | | | Comparative Examples | |
|---|---|---|---|---|---|---|---|
| | | 8 | 9 | 10 | 11 | 1 | 2 |
| Pearl pigment | | 1 | 3.9 | 7 | 3.9 | 3.9 | 3.9 |
| Second pigment | | 0.4 | 0.4 | 0.4 | 0.4 | 0.4 | 0.4 |
| Acrylic emulsion | | 2 | 2 | 2 | 1.4 | 25.6 | 0 |
| Sodium silicate | | 19.5 | 19.5 | 19.5 | 19.5 | 0 | 21.1 |
| Antifoaming agent | | 0.05 | 0.05 | 0.05 | 0.05 | 0.05 | 0.05 |
| Surface active agent | | 0.2 | 0.2 | 0.2 | 0.2 | 0.2 | 0.2 |
| Thickening agent | | 0.6 | 0.6 | 0.6 | 0.6 | 0.6 | 0.6 |
| Water | | 76.25 | 73.35 | 70.25 | 73.95 | 69.25 | 73.75 |
| Total | | 100.00 | 100.00 | 100.00 | 100.00 | 100.00 | 100.00 |
| Sodium silicate/ acrylic emulsion | | 11.80 | 11.80 | 11.80 | 16.91 | — | — |
| PWC (%) | | 8.5 | 26.6 | 39.4 | 27.0 | 26.6 | 26.6 |
| Time till generation of red rust (h) | Plate (1) | 750 | 800 | 850 | 1000 | 400 | 600 |
| | Plate (2) | 700 | 700 | 750 | 950 | 300 | 500 |
| | Chain | 750 | 800 | 850 | 1000 | 400 | 600 |
| Evaluation | Corrosion resistance | A1 | A2 | A2 | A3 | C | B |
| | Adhesion | A1 | A1 | A1 | A1 | A3 | B |

Comparative Example 1

A top coat paint of Comparative Example 1 was obtained in accordance with a composition listed in Table 3 in the same manner as in Example 1 but not using sodium silicate.

Comparative Example 2

A top coat paint of Comparative Example 2 was obtained in accordance with a composition listed in Table 3 in the same manner as in Example 1 but not using AX-6.

3. Top Coat Paint (2)

Example 21

In accordance with a composition listed in Table 4 below, the aforementioned pearl pigment, stainless steel flakes, a polyurethane water-based composition ("WS5100" manufactured by Mitsui Chemicals Inc., with an active ingredient (remaining after heating) of 30%, hereinafter referred to as "WS5100"), the aforementioned sodium silicate, the aforementioned antifoaming agent, a surface active agent, a thickening agent ("Kelzan S" manufactured by Sansho Co., Ltd., xanthan gum) and water were mixed and stirred for 1 hour, so as to give a top coat paint (2) of Example 21.

In Table 4 and Table 5 below, "Sodium silicate/polyurethane water-based composition" corresponds to a mass ratio between an active ingredient of the sodium silicate and an active ingredient of the polyurethane water-based composition, and "PWC" corresponds to a mass ratio (expressed by a percentage here) in a formed coating film between (Iriodin 103WNT) and (Iriodin 103WNT+the active ingredient of WS5100+the active ingredient of sodium silicate).

TABLE 4

(parts by mass)

| | Examples | | | | | | | | | |
|---|---|---|---|---|---|---|---|---|---|---|
| | 21 | 22 | 23 | 24 | 25 | 26 | 27 | 28 | 29 | 30 |
| Pearl pigment | 1.28 | 1.28 | 1.28 | 1.28 | 1.28 | 1.28 | 1.28 | 1.28 | 1.28 | 1.28 |
| Stainless steel flakes | 0.61 | 0.61 | 0.61 | 0.61 | 0.61 | 0.61 | 0.61 | 0.61 | 0.61 | 0.61 |
| Polyurethane water-based composition | 15.0 | 15.0 | 15.0 | 15.0 | 14.2 | 15.0 | 15.0 | 10.8 | 7.4 | 4.0 |
| Sodium silicate | 1.0 | 3.0 | 4.8 | 6.0 | 6.0 | 8.0 | 10.0 | 8.0 | 10.0 | 12.0 |
| Antifoaming agent | 0.02 | 0.02 | 0.02 | 0.02 | 0.02 | 0.02 | 0.02 | 0.02 | 0.02 | 0.02 |
| Surface active agent | 0.2 | 0.2 | 0.2 | 0.2 | 0.2 | 0.2 | 0.2 | 0.2 | 0.2 | 0.2 |
| Thickening agent | 2.5 | 2.5 | 2.5 | 2.5 | 2.5 | 2.5 | 2.5 | 2.5 | 2.5 | 2.5 |
| Water | 67.5 | 67.5 | 67.5 | 67.5 | 67.5 | 67.5 | 67.5 | 67.5 | 67.5 | 67.5 |
| Total | 88.11 | 90.11 | 91.91 | 93.11 | 92.31 | 95.11 | 97.11 | 90.91 | 89.51 | 88.11 |
| Sodium silicate/ polyurethane water-based composition | 0.11 | 0.34 | 0.54 | 0.68 | 0.72 | 0.91 | 1.13 | 1.26 | 2.30 | 5.10 |
| PWC (%) | 26.7 | 23.3 | 20.8 | 19.5 | 20.0 | 17.6 | 16.0 | 20.0 | 20.0 | 20.0 |
| Time till generation | Plate (1) 700 | 700 | 750 | 1000 | 1000 | 1000 | 1000 | 1000 | 1000 | 1000 |
| | Plate (2) 650 | 650 | 700 | 950 | 950 | 950 | 950 | 950 | 950 | 950 |

TABLE 4-continued

|  |  | Examples (parts by mass) | | | | | | | | | |
|---|---|---|---|---|---|---|---|---|---|---|---|
|  |  | 21 | 22 | 23 | 24 | 25 | 26 | 27 | 28 | 29 | 30 |
| of red rust (h) | Chain | 700 | 700 | 750 | 1000 | 1000 | 1000 | 1000 | 1000 | 1000 | 1000 |
| Evaluation | Corrosion resistance | A1 | A1 | A2 | A3 | A3 | A3 | A3 | A3 | A3 | A3 |
|  | Adhesion | A3 | A3 | A3 | A3 | A3 | A3 | A3 | A3 | A3 | A2 |

Examples 22 Through 37

Top coat paints (2) of Examples 22 through 37 were obtained in accordance with compositions listed in Table 4 and Table 5 below in the same manner as in Example 21.

TABLE 5

|  |  | Examples (parts by mass) | | | | | | |
|---|---|---|---|---|---|---|---|---|
|  |  | 31 | 32 | 33 | 34 | 35 | 36 | 37 |
| Pearl pigment |  | 1.28 | 3.68 | 5.71 | 8.58 | 3.14 | 4.88 | 7.32 |
| Stainless steel flakes |  | 0.61 | 0 | 0 | 0 | 0 | 0 | 0 |
| Polyurethane water-based composition |  | 3.7 | 15.0 | 15.0 | 15.0 | 14.2 | 14.2 | 14.2 |
| Sodium silicate |  | 37.0 | 8.0 | 8.0 | 8.0 | 6.0 | 6.0 | 6.0 |
| Antifoaming agent |  | 0.02 | 0.02 | 0.02 | 0.02 | 0.02 | 0.02 | 0.02 |
| Surface active agent |  | 0.2 | 0.2 | 0.2 | 0.2 | 0.2 | 0.2 | 0.2 |
| Thickening agent |  | 2.5 | 2.5 | 2.5 | 2.5 | 2.5 | 2.5 | 2.5 |
| Water |  | 67.5 | 67.5 | 67.5 | 67.5 | 67.5 | 67.5 | 67.5 |
| Total |  | 112.81 | 96.90 | 98.93 | 101.80 | 93.56 | 95.30 | 97.74 |
| Sodium silicate/ polyurethane water-based composition |  | 17.00 | 0.91 | 0.91 | 0.91 | 0.72 | 0.72 | 0.72 |
| PWC (%) |  | 8.4 | 30.0 | 40.0 | 50.0 | 30.0 | 40.0 | 50.0 |
| Time till generation of red rust (h) | Plate (1) | 1000 | 1000 | 1000 | 1000 | 1000 | 1000 | 1000 |
|  | Plate (2) | 950 | 950 | 950 | 950 | 950 | 950 | 950 |
|  | Chain | 1000 | 1000 | 1000 | 1000 | 1000 | 1000 | 1000 |
| Evaluation | Corrosion resistance | A3 | A3 | A3 | A3 | A3 | A3 | A3 |
|  | Adhesion | A1 | A3 | A3 | A2 | A3 | A3 | A3 |

4. Corrosion Resistant Surface-Treated Chain

A roller chain having the same structure as the roller chain 10 of FIG. 1 was fabricated.

FIG. 3 is an enlarged cross-sectional view of a part A of FIG. 1. Specifically, it is a schematic cross-sectional view illustrating a surface portion of the roller 15 of the roller chain 10.

As illustrated in FIG. 3, a zinc-iron alloy ground film 24, a first coating film 26 and a second coating film 28 are successively formed on an iron-based base material 22. The other components of the roller chain 10 (i.e., the inner link plates 11, the bush 12, the outer link plates 13 and the connecting pin 14) also have a similar layered structure in their surface portions.

After covering the iron-based base material 22 of each of the chain components with the zinc-iron alloy ground film 24 formed by the impact zinc plating, the zinc-iron alloy ground film 24 was covered with the water-based rust preventive paint of Composition Example 1 of Table 1 by the dip spin method, and the resultant was baked at 180° C., so as to form the first coating film 26. Furthermore, the first coating film 26 was covered with the top coat paint of Example 1 by the dip spin method, and the resultant was baked at 180° C., so as to form the second coating film 28. Then, the components having been subjected to the surface treatment and coating were assembled to fabricate the roller chain.

Roller chains were fabricated in the same manner as described above by forming the first coating film on the zinc-iron alloy ground film covering the iron-based base material, by using the water-based rust preventive paint of Composition Example 1, and coating films were formed on the first coating film by using the top coat paints of Examples 2 through 11, Examples 21 through 37 and Comparative Examples 1 and 2 and a conventional top coat paint. The conventional top coat paint includes none of the sodium silicate, the acrylic emulsion and the polyurethane water-based composition but includes the aforementioned pearl pigment and the KBP90 as a binder.

5. Corrosion Resistant Surface-Treated Plate

In addition to the inner link plates included in the roller chains having been subjected to the surface treatment and coating (hereinafter referred to as the plates (1)), corrosion resistant surface-treated plates as follows (hereinafter referred to as the plates (2)) were prepared.

Instead of subjecting the base material of the inner link plates to the impact zinc plating, each of them was subjected to the shot blasting, and covered with the water-based rust preventive paint of Composition Example 1 of Table 1 by the dip spin method, and the resultant was baked at 180°, so as to form a first coating film. Furthermore, the thus obtained first coating films were coated with the top coat paints of Examples 1 through 11, Examples 21 through 37 and Comparative Examples 1 and 2 by the dip spin method, and the resultants were baked at 180° C., so as to form second coating films.

6. Performance Evaluation

[Salt Spray Test (Corrosion Resistance Evaluation Test)]

The plates (1), the plates (2) and the roller chains obtained as above were subjected to a salt spray test. The test was performed in accordance with "JIS-K5600-7-1", so as to measure time elapsing until red rust was visually found on each plate. The results of the test are listed in Tables 2 through 5.

Furthermore, the test results were evaluated as follows so as to be listed in Tables 2 through 5.

A1: good
A2: better
A3: much better
B: rather reject
C: reject

[Adhesion Evaluation Test]

Filter paper was placed and fixed on an assembly apparatus for a chain, and chains were fabricated by assembling chain components each on which a coating film was formed on the first coating film by using any of the top coat paints of Examples 1 through 11, 21 through 37 and Comparative Example 1 and 2 and a conventional top coat paint. The quantity of a coating film powder generated and accumulated on the filter paper during this assembly was checked.

Figure 4A:
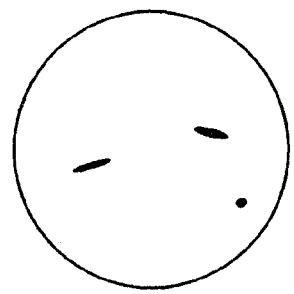
FIG. 4A is a schematic diagram illustrating the quantity of a coating film powder accumulated in fabrication of chains of Examples 1 through 6, 21 through 29, 32, 33, 35 through 37 and Comparative Example 1.
Figure 4B:
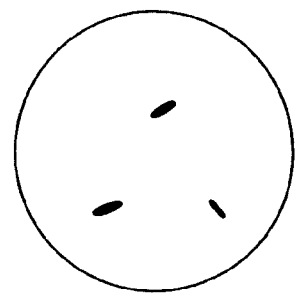
FIG. 4B is a schematic diagram illustrating the quantity of the coating film powder accumulated in fabrication of chains of Examples 7, 30 and 34.
Figure 4C:
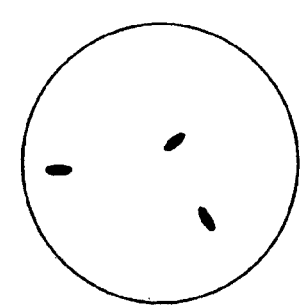
FIG. 4C is a schematic diagram illustrating the quantity of the coating film powder accumulated in fabrication of chains of Examples 8 through 11 and 31.
Figure 4D:
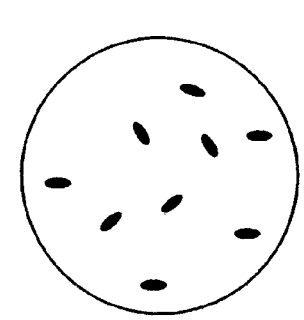
FIG. 4D is a schematic diagram illustrating the quantity of the coating film powder accumulated in fabrication of a chain of Comparative Example 2.
Figure 4E:
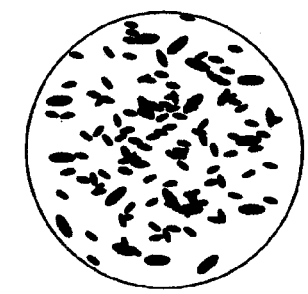
FIG. 4E is a schematic diagram illustrating the quantity of the coating film powder accumulated in fabrication of a chain using a conventional top coat paint.

FIGS. 4A through 4E are schematic diagrams illustrating the quantity of the coating film powders generated during the fabrication of the chains and accumulated on the filter paper, and FIG. 4A illustrates the quantity of the coating film powder accumulated in fabricating the chains of Examples 1 through 6, Examples 21 through 29, 32, 33, 35 through 37 and Comparative Example 1, FIG. 4B illustrates the quantity of the coating film powder accumulated in fabricating the chains of Examples 7, 30 and 34, FIG. 4C illustrates the quantity of the coating film powder accumulated in fabricating the chains of Examples 8 through 11 and 31, FIG. 4D illustrates the quantity of the coating film powder accumulated in fabricating the chain of Comparative Example 2 and FIG. 4E illustrates the quantity of the coating film powder accumulated in fabricating the chain using the conventional top coat paint.

The adhesion was evaluated as follows to be listed in Tables 2 through 5.

A1: good (FIG. 4A)
A2: better (FIG. 4B)
A3: much better (FIG. 4C)
B: rather reject (FIG. 4D)
C: reject (FIG. 4E)

[Conclusion]

It is understood from Tables 2 and 3 that the plates (1), the plates (2) and the chains fabricated by using the top coat paints of Examples 1 through 11 including both the acrylic emulsion and the sodium silicate are largely improved in the corrosion resistance and exhibit high durability as compared with the plates (1), the plates (2) and the chains fabricated by using the top coat paints of Comparative Examples 1 and 2 not including one of the acrylic emulsion and the sodium silicate.

Furthermore, it is understood from FIGS. 4A through 4E that the chains fabricated by using the top coat paints of Examples 1 through 11 and Comparative Example 1 are suppressed in powdering of the coating films and exhibit good adhesion of the coating films. As the mass ratio between the active ingredient of the sodium silicate and the active ingredient of the acrylic emulsion is larger, the adhesion of the coating film is lowered, and the adhesion is so low that the workability is degraded in the chain of Comparative Example 2 (evaluated as B), and the adhesion is further lowered in the conventional chain (evaluated as C). Accordingly, it was confirmed that the adhesion of the coating film is improved when the top coat paint includes the acrylic emulsion.

In comparing the results of the corrosion resistance evaluation test of the plates (1), the plates (2) and the chains fabricated by using the top coat paints of Examples 1 through 3 and Examples 8 through 10, in which the contents of the sodium silicate and the acrylic emulsion are the same but the PWC is different, it is understood that the corrosion resistance is improved as the PWC is larger.

Furthermore, the plates (1), the plates (2) and the chains fabricated by using the top coat paints of Examples 4 through 6, in which the content of the pearl pigment is 3.9 mass %, the mass ratio between the active ingredient of the sodium silicate and the active ingredient of the acrylic emulsion is 0.28 through 1.32 and the PWC is 26.6%, exhibit the highest corrosion resistance.

It is understood that the plates (1), the plates (2) and the chains attain well balanced corrosion resistance and adhesion of the coating film when the mass ratio between the active ingredient of the sodium silicate and the active ingredient of the acrylic emulsion is in a range from 0.1 to 17 and when the PWC is in a range from 0.08 to 0.5.

Furthermore, in comparing the plates (1) and the plates (2), it is understood that the corrosion resistance is higher when the impact zinc plating is employed as the surface treatment for the iron-based base material than when the shot blasting is employed.

The results of the corrosion resistance evaluation test for the plates (1) and the chains are consistent. It is presumed from the results for the plates (1) and (2) that good corrosion resistance may be attained when the surface of the iron-based base material of the sprocket is subjected to the impact zinc plating or the shot blasting, the first coating film is formed by using the water-based rust preventive paint of Composition Example 1, and then the second coating film is formed thereon by using the top coat paint of any of Examples 1 through 11.

It is understood from Tables 4 and 5 that the plates (1), the plates (2) and the chains fabricated by using the top coat paints of Examples 21 through 37 including both the polyurethane water-based composition and the sodium silicate are largely improved in the corrosion resistance and exhibit high durability as compared with the plate (1), the plate (2) and the chain fabricated by using the top coat paint of Comparative Example 2 including the sodium silicate but not including the polyurethane water-based composition.

It is understood from Tables 4 and 5 that the corrosion resistance is improved as the mass ratio between the sodium silicate and the polyurethane water-based composition is larger and is further improved when the mass ratio is 0.68 or more.

It is further confirmed that the adhesion is good and powdering of the coating film is suppressed in the assembly of the chain components and in use of the chain when the mass ratio between the active ingredient of the sodium silicate and the active ingredient of the polyurethane water-based composition is in a range from 0.1 to 17 and the PWC is in a range from 0.08 to 0.5, and thus, it is confirmed that the chain attains well balanced corrosion resistance and adhesion of the coating film.

Furthermore, it is presumed from the results of the plates (1) and (2) that good corrosion resistance is attained when the surface of the iron-based base material of the sprocket is subjected to the impact zinc plating or the shot blasting, the first coating film is formed by using the water-based rust preventive paint of Composition Example 1, and then the second coating film is formed thereon by using the top coat paint of any of Examples 21 through 37.

As described so far, a coating film formed by using the top coat paint of the present invention including the sodium silicate and the acrylic emulsion or the polyurethane water-based composition has good rust resistance and adhesion, and when the coating film is formed on a coating film formed on the surface of a chain or a sprocket by using a water-based rust preventive paint including zinc, it is confirmed that the chain or the sprocket exhibits good corrosion resistance, that the workability and the appearance quality are good since powdering of the coating film is suppressed, and that the thickness of the coating film is retained uniformly.

The present invention provides a highly corrosion resistant surface-treated chain such as a bushed chain or a roller chain for use in a corrosive atmosphere and is applicable to any of chains for various uses such as a conveyor chain, a carrying conveyor chain and a transmission chain. Furthermore, the invention is applicable to a sprocket for use in a corrosive atmosphere.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A top coat paint for overpainting a coating film formed of a water-based rust preventive paint including zinc, the top coat paint comprising:
    a pigment;
    sodium silicate; and
    an acrylic emulsion or a polyurethane water-based composition, wherein the acrylic emulsion is obtained by emulsion polymerizing a polymerizable monomer including a monomer having an alkoxysilyl group and having an ethylene double bond.

2. The top coat paint according to claim 1, wherein a mass ratio between a weight of the sodium silicate remaining after heating and a weight of the acrylic emulsion remaining after heating is in a range from 0.1 to 17.

3. The top coat paint according to claim 1, wherein the polyurethane water-based composition is obtained by mixing a polyurethane resin having at least one silanol group in a molecule and strong basic tertiary amine, and a mass ratio between weight of the sodium silicate remaining after heating and a weight of the polyurethane water-based composition remaining after heating is in a range from 0.1 to 17.

4. The top coat paint according to claim 1, wherein the pigment is a mica powder pigment or a titanated mica pigment, and a mass ratio between a weight of the pigment and a total mass comprising the pigment, the sodium silicate, and an active ingredient of the acrylic emulsion or the polyurethane water-based composition remaining after heating is in a range from 0.08 to 0.5.

5. The top coat paint according to claim 4, further comprising stainless steel flakes.

6. The top coat paint according to claim 2, wherein the pigment is a mica powder pigment or a titanated mica pigment, and a mass ratio between a weight of the pigment and a total mass comprising the pigment, the sodium silicate, and the acrylic emulsion remaining after heating is in a range from 0.08 to 0.5.

7. A corrosion resistant surface-treated chain made of an iron-based material, comprising:
    a pair of outer link plates and a pair of inner link plates which are alternately connected to each other; and
    a first coating film formed on a surface of the iron-based material by using a water-based rust preventive paint including zinc,
    wherein the chain comprises a second coating film formed on the first coating film by using the top coat paint of claim 1.

8. A corrosion resistant surface-treated chain made of an iron-based material, comprising:
    a pair of outer link plates and a pair of inner link plates which are alternately connected to each other; and
    a first coating film formed on a surface of the iron-based material by using a water-based rust preventive paint including zinc,
    wherein the chain comprises a second coating film formed on the first coating film by using the top coat paint of claim 2.

9. A corrosion resistant surface-treated chain made of an iron-based material, comprising:
    a pair of outer link plates and a pair of inner link plates which are alternately connected to each other; and
    a first coating film formed on a surface of the iron-based material by using a water-based rust preventive paint including zinc,
    wherein the chain comprises a second coating film formed on the first coating film by using the top coat paint of claim 3.

10. A corrosion resistant surface-treated chain made of an iron-based material, comprising:
    a pair of outer link plates and a pair of inner link plates which are alternately connected to each other; and
    a first coating film formed on a surface of the iron-based material by using a water-based rust preventive paint including zinc,
    wherein the chain comprises a second coating film formed on the first coating film by using the top coat paint of claim 4.

11. A corrosion resistant surface-treated chain made of an iron-based material, comprising:
    a pair of outer link plates and a pair of inner link plates which are alternately connected to each other; and
    a first coating film formed on a surface of the iron-based material by using a water-based rust preventive paint including zinc,
    wherein the chain comprises a second coating film formed on the first coating film by using the top coat paint of claim 5.

12. The corrosion resistant surface-treated chain according to claim 7, further comprising a zinc-iron alloy ground film formed between the surface and the first coating film by impact zinc plating.

13. The corrosion resistant surface-treated chain according to claim 7, wherein the water-based rust preventive paint comprises zinc, nitrate, and an organic compound having a mercapto group other than a mercapto group-containing silane coupling agent.

14. A corrosion resistant surface-treated sprocket made of an iron-based material, comprising:
    teeth to be engaged with a chain on an outer circumference thereof; and a first coating film formed on a surface of the iron-based material by using a water-based rust preventive paint,
wherein the sprocket comprises a second coating film formed on the first coating film by using the top coat paint of claim 1.

15. A corrosion resistant surface-treated sprocket made of an iron-based material, comprising:
teeth to be engaged with a chain on an outer circumference thereof; and
a first coating film formed on a surface of the iron-based material by using a water-based rust preventive paint including zinc,
wherein the sprocket comprises a second coating film formed on the first coating film by using the top coat paint of claim 2.

16. A corrosion resistant surface-treated sprocket made of an iron-based material, comprising:
teeth to be engaged with a chain on an outer circumference thereof; and
a first coating film formed on a surface of the iron-based material by using a water-based rust preventive paint including zinc,
wherein the sprocket comprises a second coating film formed on the first coating film by using the top coat paint of claim 3.

17. A corrosion resistant surface-treated sprocket made of an iron-based material, comprising:
teeth to be engaged with a chain on an outer circumference thereof; and
a first coating film formed on a surface of the iron-based material by using a water-based rust preventive paint including zinc,
wherein the sprocket comprises a second coating film formed on the first coating film by using the top coat paint of claim 4.

18. A corrosion resistant surface-treated sprocket made of an iron-based material, comprising:
teeth to be engaged with a chain on an outer circumference thereof; and
a first coating film formed on a surface of the iron-based material by using a water-based rust preventive paint including zinc,
wherein the sprocket comprises a second coating film formed on the first coating film by using the top coat paint of claim 5.

19. The corrosion resistant surface-treated sprocket according to claim 14, further comprising a zinc-iron alloy ground film formed between the surface and the first coating film by impact zinc plating.

20. The corrosion resistant surface-treated sprocket according to claim 14, wherein the water-based rust preventive paint comprises zinc, nitrate, and an organic compound having a mercapto group other than a mercapto group-containing silane coupling agent.

21. The top coat paint according to claim 1, wherein the acrylic emulsion is obtained by emulsion polymerizing a monomer including an acrylic acid-based monomer as a principal component via an emulsifier in an aqueous system.

22. A top coat paint for overpainting a coating film formed of a water-based rust preventive paint including zinc, the top coat paint comprising:
a pigment;
sodium silicate; and
an acrylic emulsion or a polyurethane water-based composition,
wherein the acrylic emulsion is obtained by emulsion polymerizing a polymerizable monomer including a monomer having an alkoxysilyl group and having an ethylene double bond, and a mass ratio between the sodium silicate remaining after heating and the acrylic emulsion remaining after heating is in a range from 0.1 to 17, and
wherein the polyurethane water-based composition is obtained by mixing a polyurethane resin having at least one silanol group in a molecule and strong basic tertiary aminea, and a mass ratio between the sodium silicate remaining after heating and the polyurethane water-based composition remaining after heating is in a range from 0.1 to 17.

* * * * *